United States Patent [19]
Corkum

[11] Patent Number: 4,612,641
[45] Date of Patent: Sep. 16, 1986

[54] INFRARED PULSE COMPRESSION

[75] Inventor: Paul B. Corkum, Gloucester, Canada

[73] Assignee: Canadian Patents & Development Limited, Ottawa, Canada

[21] Appl. No.: 611,952

[22] Filed: May 18, 1984

[51] Int. Cl.⁴ .............................................. H01S 3/10
[52] U.S. Cl. ...................................... 372/25; 372/76; 372/55; 372/70; 372/54
[58] Field of Search ...................... 372/25, 54, 70, 106, 372/108, 18-20, 55, 76

[56] References Cited

U.S. PATENT DOCUMENTS 3,720,884 3/1973 Kelley et al.
3,979,694 9/1976 Goldhar et al. ...................... 372/25

OTHER PUBLICATIONS

Shank et al., "Compression of Femtosecond Optical Pulses"; Appl. Phys. Lett., 40(9), May 1, 1982.
Jamison et al.; "Generation of Picosecond Pulses of Variable Duration a 10.6 μm"; Appl. Phys. Lett., 33(7), Oct. 1, 1978.
Lehmberg; "Compression and Shaping of Pulses from High Power Solid State Lasers"; 1973 Int. Electron Devices Meet. Tech. Digest, Wash., D.C. (Dec. 3–5, 1973).

*Primary Examiner*—Léon Scott, Jr.
*Attorney, Agent, or Firm*—Cushman, Darby & Cushman

[57] ABSTRACT

A plasma is induced in a transmissive medium, and causes a chirp to be impressed on an optical pulse. The chirped pulse when passed through a dispersing means is then compressed. Applications of this pulse compression technique include the generation of short pulses of infrared at high power levels. Picosecond pulses of 10 micron energy are generated by switching a 2 picosecond portion from the output of a multi-atmosphere laser oscillator, and amplifying the portion in a $CO_2$ gain module operated at gain saturation to cause a plasma front to propagate with the portion being amplified. A blue chirp of the pulse results. The pulse is passed through a dispersive medium, and a substantial decrease in pulse width and increase in energy density occurs during successive passes of the pulse through the gain module. Pulses as short as 500 femtoseconds have been produced at power densities of the order of $10^{12}$ watts/cm². A TE/$CO_2$ oscillator is used as the source of pulses, which are switched by a dye laser and a pair of cadmium/telluride reflection switches and a silicon transmission switch, and a TE/$CO_2$ multi-atmosphere gain module with sodium chloride windows amplified and shortens the pulse during successive passes through the module.

24 Claims, 7 Drawing Figures

THE PEAK ENERGY PULSE IN THE TRAIN

THE SIXTH PULSE AFTER THE PEAK ENERGY PULSE

THE TENTH PULSE AFTER THE PEAK ENERGY PULSE

INFRARED PULSE COMPRESSION

The present invention relates to processes and apparatus for pulse compression at infrared wavelengths and for the generating of short duration, high intensity infrared pulses.

BACKGROUND OF THE INVENTION

Short, low power pulses can be generated throughout the visible, near infrared and ultraviolet regions.

Progress in short pulse generation in the visible has traditionally resulted from improvements in actively or passively mode-locked lasers. At other frequencies, however, this has not been the case.

U.S. Pat. No. 3,720,884, issued Mar. 13, 1973 to Kelley et al, discloses a technique for compressing optical pulses by chirping the pulse in a Kerr cell, and passing these pulses through a dispersive delay line to achieve the required compression. This technique is limited to near infrared or higher frequencies.

U.S. Pat. No. 3,979,694, issued Sept. 7, 1976 to Goldhar et al, teaches the generation of short pulses having a duration of between 0.1 and 0.5 nanoseconds by using a gaseous breakdown switch and a hot gaseous absorption cell in conjunction with a $CO_2$ transverse excitation laser. The apparatus and method taught by Goldhar et al does not, however, provide for the possibility of generating pulses as short as picosecond or femtosecond pulse durations, but rather produces pulses having a duration of the order of nanoseconds by a technique which involves the spectral filtering of the output of a gas breakdown switch using a hot linearly absorbing gas cell or a spectral filter formed by a tandem grating monochromator of the type which is a tandem dual-slit monochromator.

There is a need for the generation of extremely short infrared pulses in the fields of multiphoton chemistry, plasma physics, and nuclear fusion. This need is not satisfied by any known prior art apparatus or method.

The concept of efficiently compressing optical pulses by impressing a frequency chirp on the pulse and then passing the pulse through a linear dispersing medium for pulse shortening, was proposed many years ago. Kerr liquids such as $CS_2$ can provide such a chirp. However, in liquids, self-focussing is normally associated with frequency chirping. It has remained for the development of low loss, single-mode optical fibers to make the process reproducible. Thus, it is only with the recent improvement in optical fibers that optical pulse compression has begun to have an important impact on the development of picosecond/femtosecond sources.

Low-loss, single-mode optical fibers are not available in the mid-infrared. Even if they were, the wavelength scaling of self-phase modulation in Kerr-like materials would make this approach to optical pulse compression somewhat less attractive. Plasma production can provide an alternative technique for chirping pulses; a technique especially suited to the infrared.

In Kelley et al, supra, a frequency chirp is impressed on an optical pulse as a result of the nonlinearity of the refractive index $(\eta = \eta_o + \eta_2 E^2)$ associated with different optical intensities. That is, the phase velocity is dependent on the intensity and, therefore, on the temporal position within the pulse. Any process that produces an index of refraction that is different for different temporal positions in the pulse will, likewise, produce a frequency chirp.

This invention shows a technique for compressing optical pulses that is particularly suited to the infrared, although not necessarily restricted to the infrared. It is also particularly suited to high power pulses, but not restricted to them.

SUMMARY OF THE INVENTION

The present invention provides a technique for the compression of optical pulse by pulse chirping due to plasma production using plasma production means including:

electrical avalanche "breakdown" of a gas, semiconductor or dielectric material;

self plasma production in a gas, semiconductor or dielectric material due to the interaction of the pulse itself with the material, such process can include single photon or multi-photon ionization, avalanche ionization or tunneling;

controlled plasma production in a gas, semiconductor or dielectric due to the action of a synchronized control pulse; and subsequent compression using a dispersing means.

The present invention also provides a technique for the generation of picosecond 10 micron pulses by amplification in a multi-atmosphere transverse excitation $CO_2$ gain module operated at gain saturation to cause a plasma front to propagate with the pulses to cause the pulses to have a blue chirp impressed on them, and the subsequent compression of the amplified and chirped picosecond pulses to approximately 600 femtoseconds using a dispersive medium. In one embodiment of the invention, a short pulse is generated by switching a 2 picosecond portion from the single longitudinal mode output of a hybrid $CO_2$ oscillator using two polycrystalline cadmium telluride (CdTe) slabs for reflection switches and a single thin silicon slab for transmission attenuation. The reflection switches are controlled with a 2 picosecond pulse obtained from a mode-locked dye laser. The 2 picosecond 10 micron pulse is injected into a modified multi-atmosphere $CO_2$ gain module laser using a sodium chloride (NaCl) wedged beam splitter and dispersive medium positioned within the laser resonator. The mirror separation for the laser is selected to give a minimum beam diameter of 0.1 cm. and an associated depth of field of 40 cm. to match the gain length of the amplifier module. The NaCl laser windows on the discharge module are mounted at the end of long extension tubes to avoid the possibility of optical damage. As is conventional, these windows are mounted at Brewster's angle. The laser cavity consists of two 1.5 m. radius of curvature gold-coated stainless steel mirrors separated by 290 cm. Mode-locked operation is obtained by injecting a short 10 micron pulse into the $CO_2$ gain module. Output pulses as short as 2 picoseconds have been obtained with this apparatus at gains as large as $10^{10}$. Very high power density operation of a transverse excitation $CO_2$ amplifier module is possible and subpicosecond 10 micron pulses can be generated using a plasma-based pulse compression technique as discussed below.

BRIEF DESCRIPTION OF THE DRAWINGS

In drawings which illustrate an embodiment of the invention and its theory of operation.

DETAILED DESCRIPTION OF THE INVENTION

Figure 1:
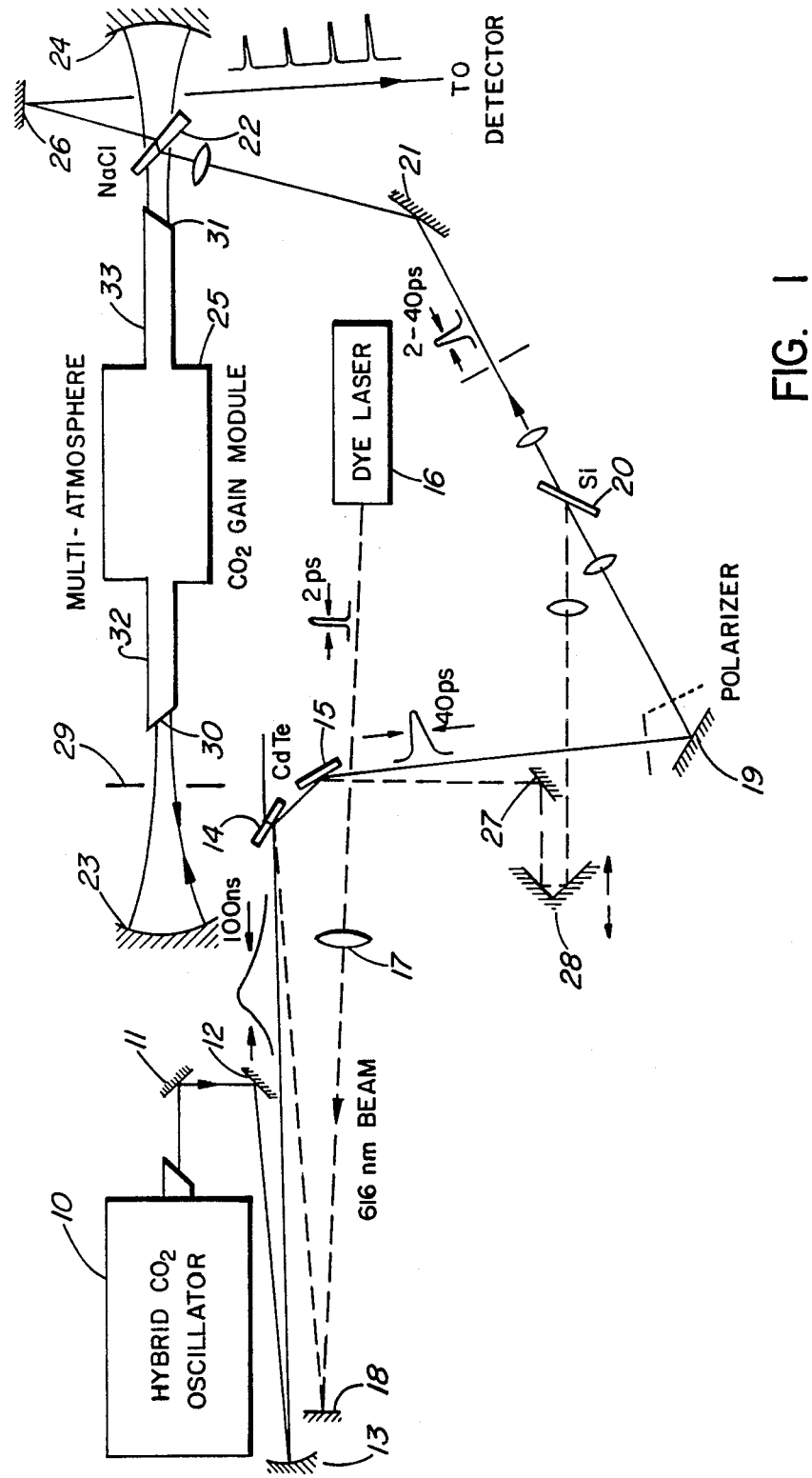
FIG. 1 is a schematic diagram illustrating the apparatus of the present invention.

With reference to FIG. 1, the apparatus disclosed includes a hybrid $CO_2$ transverse excitation laser oscillator 10, the output of which is passed via a series of mirrors 11, 12 and 13 to a pair of CdTe laser controlled reflection switch slabs 14 and 15. Simultaneously a 2 picosecond pulse from the dye laser 16 is focussed through lense 17 and reflected by mirror 18 onto the reflection switches 14 and 15, thus enabling these switches to reflect the 10 micron beam from the $CO_2$ oscillator 10 via the polarizer 19, the silicon transmission switch 20 and the mirror 21 onto the NaCl beam splitter 22 which is mounted in the laser resonator consisting of mirrors 23 and 24 of a $CO_2$ multiatmosphere laser amplifier 25. The construction and operation of semiconductor switches is described in U.S. Pat. No. 4,190,811, granted Feb. 26, 1980 to Alcock et al.

The approximately 2 picosecond pulse obtained from the reflection switches 14 and 15 is amplified in multiple passes in the multi-atmosphere $CO_2$ laser amplifier 25, and compressed by plasma chirping and compression and the shortened pulse obtained from the laser is passed via the wedged beam splitter 22 to a mirror 26 and to various detectors which will be discussed below.

The laser oscillator 10 is a hybrid $CO_2$ laser oscillator utilizing a gas mixture of helium (He), nitrogen ($N_2$), hydrogen ($H_2$) and $CO_2$ and, in one commercial form, a Lumonics model 820 laser may be used for the oscillator 10. The output pulse of this laser oscillator is of course relatively long, and a short pulse is obtained by switching a 2 picosecond portion from the single longitudinal mode output of the oscillator 10 utilizing the reflection switches 14 and 15 controlled by the dye laser 16. The $10^5$ watt picosecond pulse obtained utilizing this technique had a signal-to-background power contrast ratio of $10^6$:1. The attenuator 20 is also switched by the same dye laser pulse 16, the beam of which is reflected by a mirror 27 to operate the silicon attenuator 20 permitting a 2 picosecond pulse to be injected into the laser amplifier 25 via the NaCl wedged beam splitter 22.

The laser amplifier 25 may suitably be a Lumonics model 880 multi-atmosphere transverse excitation $CO_2$ laser used as a gain medium in a regenerative amplifier. The laser has an active volume of $1 \times 1 \times 40$ cm$^3$ and may be operated at a pressure of 10 atmospheres with a ratio of $H_2:N_2:CO_2:He$ of 3:3:5:89. This gas mix gives a small-signal gain of approximately 2 percent/cm.

The laser cavity consists of the mirrors 23 and 24 having radii of curvature of 1.5 m. and may suitably be concave gold-coated stainless steel mirrors separated typically by a spacing of 290 cm. A mode-control aperture 29 is placed 50 cm. from one mirror. The beam splitter 22 is also placed within the laser cavity and tilted approximately 30° with respect to the optic axis and is used to sample the regeneratively amplified pulse on each transit through the resonator. By choosing the appropriate reflectors, the beam waist and depth of field of the laser were selected to give a minimum beam diameter of 0.1 cm. and an associated depth of field of 40 cm. to match the 40 cm. gain length of the amplifier module 25.

To eliminate the possibility of optical damage, the NaCl laser windows 30 and 31 were mounted at the end of long extension tubes 32 and 33. The beam diameter at each of the windows 30 and 31, which are of course situated at Brewster's angle, was approximately 0.5 cm. With all other optical components in the system further removed from the beam waist, the possibility of optical damage was unlikely.

Mode-locked operation of the laser amplifier 25 was obtained by injecting a short 10 micron pulse into the slave resonator by reflection from the intracavity wedged beam splitter 22. Matching the wavefront of the injected radiation to a cavity mode was attempted only in a very approximate manner.

The apparatus as described has been operated and it was found that multi-atmosphere transverse excitation $CO_2$ modules can be used to amplify pulses as short as 2 picoseconds through a very large gain of the order of $10^{10}$; that very high power density operation of transverse excitation $CO_2$ amplifiers is possible; and that subpicosecond 10 micron pulses can be generated using a plasma-based pulse compression technique.

Figure 2A:
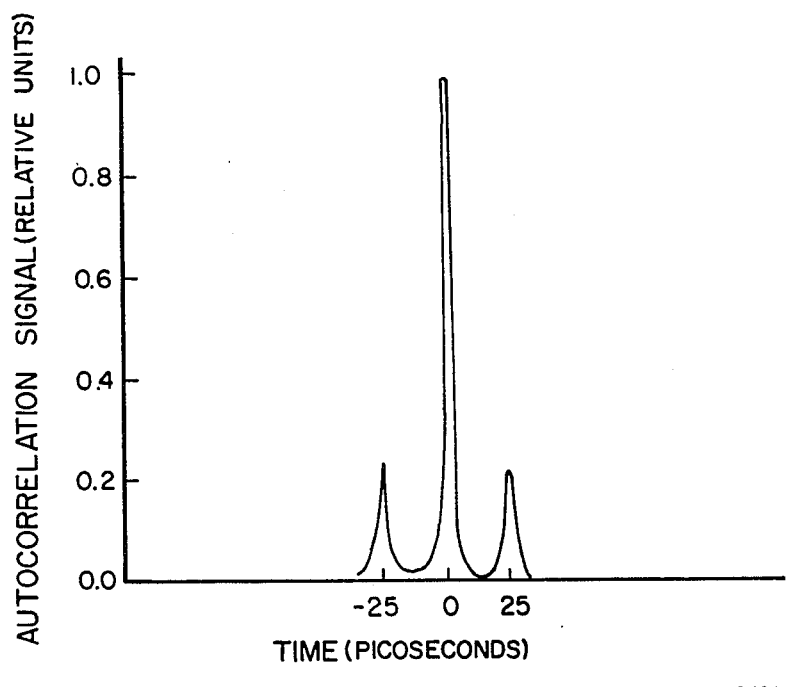
FIGS. 2a, 2b, 2c and 2d are diagrams illustrating the pulse width against relative intensity of output pulses obtained from the apparatus of FIG. 1.
Figure 2B:
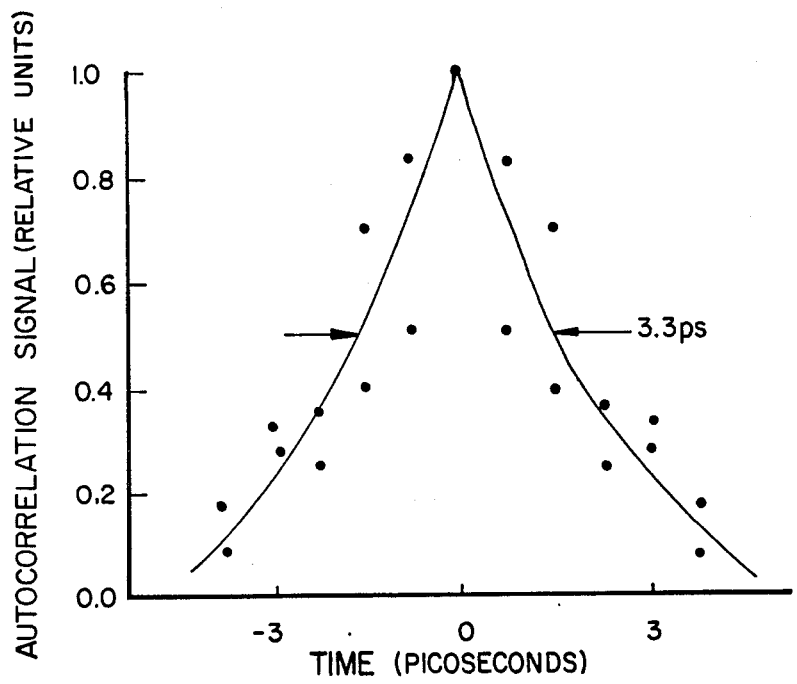

Operation of the system as described above shows that there is a circulating energy in the regeneratively amplified pulse which reaches a maximum value of 15 +/−5 mJ, corresponding to an energy density of 1.5 J/cm$^2$. The circulating energy remains above 750 mJ/cm$^2$ for about twenty transits through the gain medium. A single pulse from the train was monitored on a detector (not shown). In order to more precisely determine the pulse duration, or time resolution of the detected output pulse, an infrared autocorrelator was constructed using Proustite as the nonlinear element. FIGS. 2a, 2b, 2c and 2d are displays of autocorrelation traces of selected pulses in the mode-locked train. In particular, FIGS. 2a and 2b show the autocorrelation trace of the peak energy pulse plotted on different time scales, while the sixth and tenth pulses are displayed in FIGS. 2c and 2d respectively. For FIG. 2a, a 4 picosecond injected pulse was used.

As shown in FIG. 2a, a pre-pulse and a post-pulse are separated from the main pulse by 25 picoseconds. The 25 picoseconds corresponds to the rotational line separation in the 9.4 micron R band of $CO_2$ and is a clear indicator of a residual gain structure due to the individual rotational lines. After gain saturation the pre- and post-pulses become progressively less intense in relation to the central autocorrelation peak. By the third pulse after the peak in the mode-locked train, the pre-and post-pulses fall below the 1 percent level and cannot be resolved. For comparison purposes, only the central portion of the autocorrelation trace is plotted in FIG. 2b.

Figure 2C:
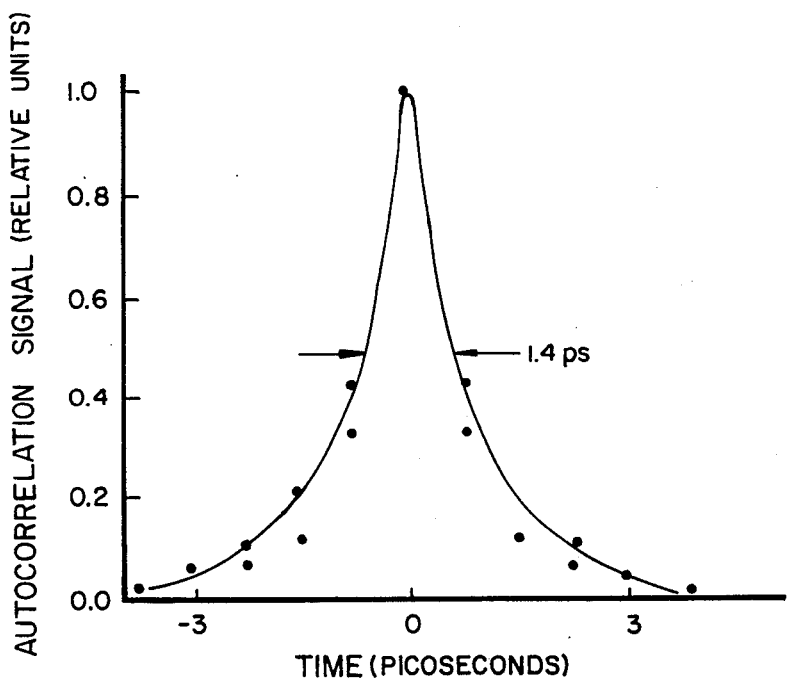
Figure 2D:
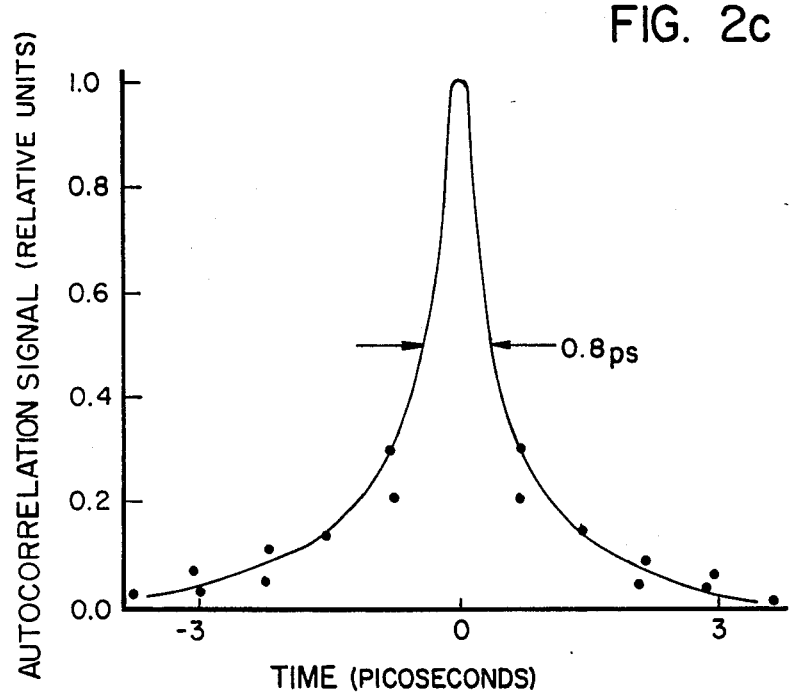

Taken together, FIGS. 2b, 2c and 2d show a clear decrease in the autocorrelation width of the circulating pulse after the maximum energy pulse in the mode-locked train. The peak energy pulse shown in FIG. 2b has an autocorrelation width of approximately 3 picoseconds. This width implies an acutal pulse width, assuming a Gaussian distribution, of approximately 2 picoseconds. A 2 picosecond pulse with an energy density of 1.5+/−0.5 J/cm$^2$ in the gain medium has a power density of approximately $10^{12}$ watts/cm$^2$. This is by far the highest intensity that can be obtained in any laser medium in a diffraction-limited pulse.

After twelve additional transits through the gain medium the pulse, which is illustrated in FIG. 2c, has an autocorrelation width of 1.4 picoseconds. FIG. 2d shows the minimum autocorrelation pulse width obtained under these resonator conditions. Here the autocorrelation width is only 800 femtoseconds implying a probable pulse width of approximately 600 femtoseconds. No additional pulse compression was observed, and in fact the pulse duration is found to increase after the minimum pulse width has been achieved. It should be noted that at the time of minimum pulse duration the energy density of the regeneratively amplified pulse, measured in the gain medium, is still about 750 mJ/cm$^2$ which implies a power density above $10^{12}$ watts/cm$^2$.

The power densities reached by a picosecond pulse, amplified to saturation in a high pressure $CO_2$ gain medium, are very high. It is well known that high power density radiation will cause resonant or near resonant transitions to be power broadened. At a circulating power of $10^{12}$ watts/cm$^2$, the Rabi frequency for the $CO_2$ lasing transition is 13 cm$^{-1}$ (0.11 microns). Thus, the peak energy pulse in the mode-locked train (spectral bandwidth approximately 0.04 microns) and subsequent high power pulses, have access, even on the picosecond time scale, to nearly all the energy stored in the 9.4 micron R branch, independent of the rotational transition. Neither the gain inhomogeneity, nor the incomplete overlap of the rotational lines, is likely to be important for very high power density pulses. This is of considerable practical importance for the design of high power gas lasers. (Power broadening may also account, at least in part, for the decrease in the power of the pre- and post-pulses (FIG. 2a) compared with that in the main pulse.)

In order to explain the cause of the pulse shortening observed during operation of the apparatus of the present invention, the following theory is offered. It should be noted that most of the compression occurs after gain saturation in the amplifier 25. Thus, pulse compression in unlikely to be directly related to the amplification process itself. Furthermore a 600 femtosecond pulse must have a spectral bandwidth approximately as large as the full width half maximum bandwith of the 9 micron R transition. Clearly a pulse of this bandwidth could not be amplified through a gain of $10^{10}$ without considerable spectral narrowing. In contrast, the 2 picosecond pulse observed at peak intracavity energy density has a spectral bandwidth of 0.04 microns, a value consistent with high gain amplification. Thus it appears that pulse compression requires a spectral broadening mechanism. A qualitative description of this spectral broadening mechanism is discussed below.

The power density for a picosecond pulse is well above the power density required for avalanche breakdown of the gain medium. Since there is no lack of electrons with which to initiate breakdown (approximately $10^{12}$/cm$^3$ at the time of gain saturation), significant plasma production occurs. Clearly, at least two collisions are requried to randomize the approximately 15 eV oscillatory energy of the electrons and to allow the electrons to obtain sufficient energy to reach the 25 eV ionization energy of helium (the dominant gas species). However, the collision frequency of a 5–30 eV electron with helium is approximately 200 femtoseconds for pressures of 10 atmospheres. Thus even at $10^{12}$ watts/cm$^2$ a new generation of electrons requires a minimum time of two collisions of approximately 0.4 picoseconds.

A plasma production front can, therefore, be expected to propagate with the picosecond pulse through the gain medium. The magnitude of the density step across this front is a function of the power density, the pulse duration and the collision frequency.

A plasma production front, such as the one just described, impresses a blue chirp on the circulating pulse due to the falling index of refraction. This blue chirp, combined with the anomalous dispersion in the NaCl windows ($\frac{1}{2}$ in. thick) and beam splitter (also $\frac{1}{2}$ in. thick) accounts for the observed pulse compression.

To confirm the above explanation, the spectrum of each pulse in the mode-locked train was recorded. The spectrum of an early pulse (three before the peak energy pulse) and a late pulse (six after the peak energy pulse) is plotted in FIG. 3. As expected, the regeneratively amplified pulse is predominately blue-shifted. The spectral width is observed to increase from 0.04 microns for pulses before the peak energy pulse (solid curve) to 0.12 microns over the next eighteen transits through the gain medium (dashed curve).

Figure 3:
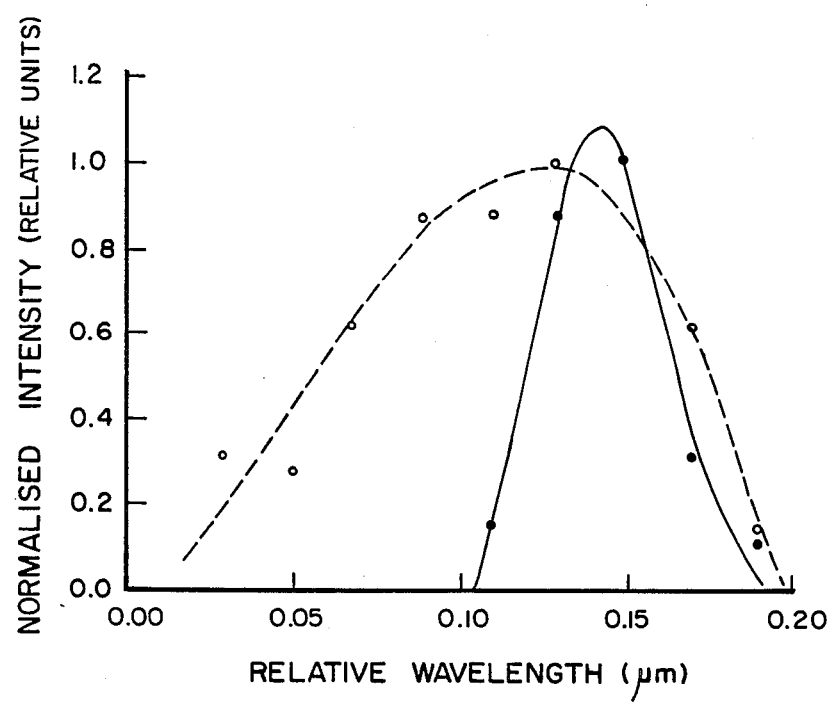
FIG. 3 is a diagram illustrating the relative wavelength of pulses and illustrating the blue shift obtained due to the plasma chirping effect of the apparatus of the present invention.

The data in FIG. 3 were not taken simultaneously with autocorrelation measurements. In fact the resonator conditions were not identical, for example, the separation of the resonator mirrors has been decreased to 280 cm. However, it seems clear that the period of most pulse shortening is associated with a strong blue shift. Either longer or shorter pulses (autocorrelation pulse widths as short as 500 femtoseconds) are observed for other resonator conditions. The shortest pulses occur only when the intracavity losses are minimized. Then the output train becomes less reproducible. This irreproducibility appears to be due to intracavity breakdown, which is strong enough to modify the transmission and/or divergence of the circulating pulse.

In addition, pulses late in the train show a significant red shift (not shown). This appears to occur for low power pulses and represents a net transfer of energy into the red spectral region. At present, the cause of this feature is not clear.

Picosecond 10 micron pulses can be compressed by a pulse compression technique consisting of plasma chirping and anomalous dispersion. This technique is broadly applicable throughout the infrared spectral region. Because of the wide variety of materials in which plasma production is possible (e.g. semiconductors), and because of the possibility of using other, more controlled means of free carrier production, plasma pulse compression can lead to even shorter 10 micron pulses in the future as well as subpicosecond pulses at other infrared frequencies.

The necessary plasma for inducing the chirp on the optical pulse can also be induced in a semiconductor, such as germanium or a silicon. A plasma is generated in the semiconductor which propagates with the optical pulse, and impresses a chirp on the pulse which, when passed through a suitable dispersive medium results in temporal compression on the optical pulse.

Figure 4:
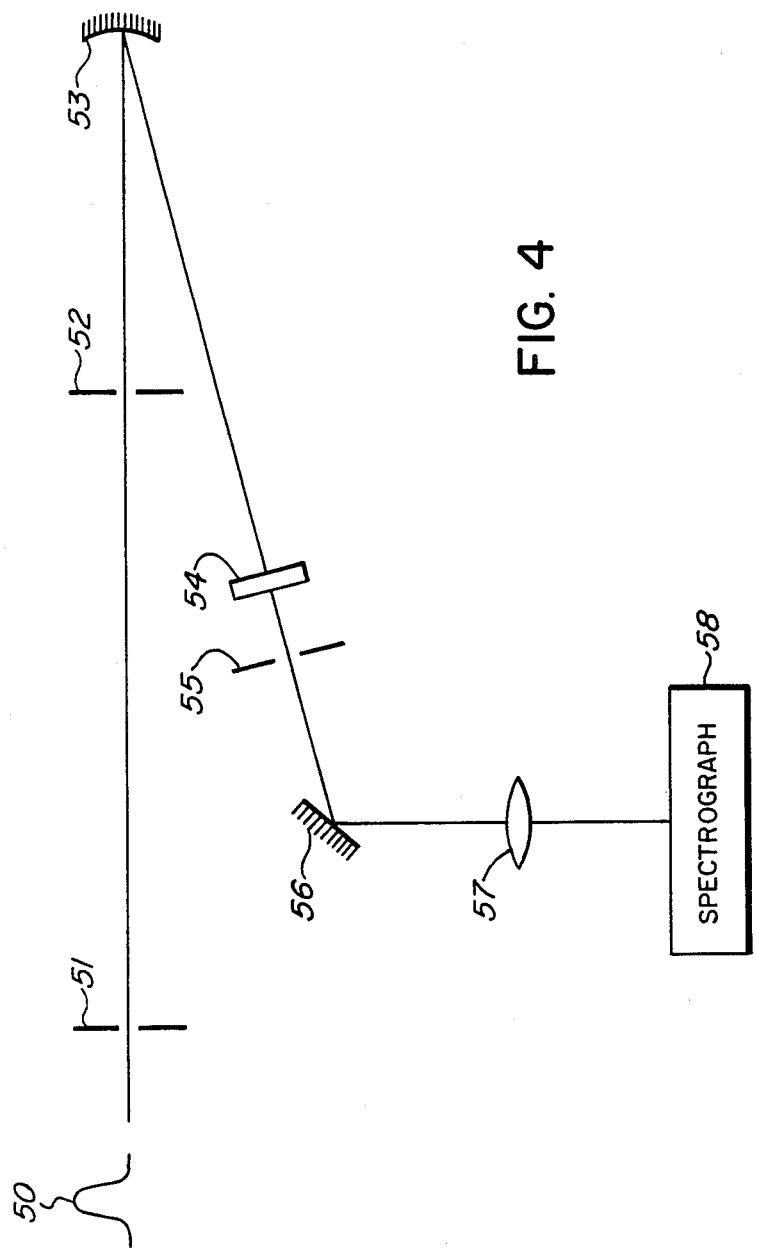
FIG. 4 is a schematic diagram illustrating plasma production in a semiconductor.

FIG. 4 illustrates apparatus for compressing a pulse using a semiconductor as the plasma medium. As input pulse 50 is passed through alignment apertures 51 and 52 and is reflected by a mirror 53 onto a germanium specimen 54. The transmitted optical pulse is passed by the aperture 55 reflected by the mirror 56 focussed by the lense 57 into a spectral graph 58. The focal spot diameter on the germanium sample 54 is approximately 200 micrometers and the energy density on the germanium specimen was approximately 20 mJ/cm$^2$. The aperture plate 55 had an aperture diameter of approximately 300 micrometers. The input pulse 50 at intensities of greater than $2.5 \times 10^9$ watts/cm$^2$ causes a plasma to be produced in the semiconductor which becomes a sufficiently great to chirp the pulse. The spectrum of the chirped pulse is remarkably similar to that illustrated in FIG. 3.

Thus, in accordance with the present invention, a plasma may be generated in either a gas or a semiconductor and the plasma produced can cause a chirp in a transmitted optical pulse which then, by being passed through a dispersing medium, becomes compressed. In the first embodiment, a short pulse is coupled into a cavity of a high pressure $CO_2$ laser. In the amplifier it is amplified to such a high power that it begins to break down the gas. This plasma production chirps the pulse while the sodium chloride in the laser resonator acts as a dispersing material to compress the pulse. Similarly, the short pulse focussed onto a semiconductor causes a plasma to be produced in the semiconductor which chirps the pulse, which may then be compressed in a suitable dispersing medium such as, for example, sodium chloride.

I claim:

1. A process for compressing optical pulses comprising:
   producing a plasma in a gas, semiconductor or dielectric medium,
   propagating optical pulses through said medium along with said plasma production thereby resulting in amplified pulses having a blue chirp impressed on them, and propagating said amplifier and chirped pulses through a dispersing means, such that said pulses are compressed by said dispersing means.

2. A process as defined in claim 1 wherein said plasma is produced by electrical avalanche breakdown of said gas, semiconductor, or dielectric.

3. A process as defined in claim 1 wherein said plasma is produced in said gas, semiconductor or dielectric by the interaction of said optical pulses and said medium.

4. A process as defined in claim 1 wherein said plasma production is synchronized with the optical pulses by a control pulse.

5. A process as defined in claim 1 wherein said optical pulse is an infrared pulse, said medium is an active volume of a carbon dioxide gas laser, and said dispersing means is a sodium chloride crystal.

6. A process for shortening an infrared pulse comprising amplifying said pulse to high power in an infrared laser amplifier so that avalanche breakdown of the gain medium occurs, thereby causing a plasma breakdown front to propagate with said pulse, and thereby chirping said pulse, and passing said amplified and chirped pulse through a dispersing medium whereby a shortened pulse is obtained.

7. A process as defined in claim 6 wherein said amplifier is a multi-atmosphere carbon dioxide gain module.

8. A process as defined in claim 6 wherein said dispersing medium is sodium chloride.

9. A process as defined in claim 6 wherein said amplifier is a multi-atmosphere carbon dioxide gain module, and said dispersing medium is sodium chloride.

10. A process as defined in claim 9 wherein said dispersing medium is also used for windows in said amplifier.

11. Apparatus for shortening an infrared pulse comprising means for producing a plasma in a medium in which a plasma can be produced, means for propagating an infrared pulse through said medium together with said plasma to chirp said pulse, and a dispersing medium through which said chirped pulse is passed to produce a shortened pulse, and means for propagating said chirped pulse through said dispersing means whereby said pulse is compressed.

12. Apparatus as defined in claim 11 in which said means for generating a plasma to chirp said pulse comprises a multi-atmosphere carbon dioxide laser gain module.

13. Apparatus as defined in claim 12 in which said dispersing medium is sodium chloride.

14. Apparatus as defined in claim 13 wherein said dispersing medium is used as windows for said multi-atmosphere gain module.

15. Apparatus as defined in claim 11 in which said dispersing medium is sodium chloride.

16. A process for the production of a shortened infrared pulse having a duration of the order of one picosecond, comprising:
   generating an infrared pulse having a substantially longer duration than one picosecond, switching a portion from said pulse,
   injecting said portion into a multi-atomosphere carbon dioxide gain module,
   amplifying said portion regeneratively, to cause a plasma production front to propagate with said amplified portion, thereby causing a blue chirp on said portion and passing said amplified portion through a dispersive medium.

17. A process as defined in claim 16 and positioning said dispersive medium within the gain module.

18. A process as defined in claim 16 wherein said injection is effected by positioning an injection means within said gain module.

19. A process as defined in claim 16 and further comprising generating a train of pulses each having a duration substantially longer than one picosecond, said train having differing pulse energies and a pulse of maximum energy, said pulse to be shortened being located in said train after said pulse of maximum energy.

20. Apparatus for the production of infrared pulses of the order of one picosecond in duration comprising means for generating an infrared pulse having a substantially longer duration than one picosecond, means for switching a portion from said infrared pulse, mean for injecting said portion into a multi-atmosphere carbon dioxide laser gain module, said gain module regeneratively amplifying said portion to cause a plasma production front to propagate with said amplified portion, thereby causing a blue chirp on said amplified portion, and a dispersive medium through which said amplified portion is passed.

21. Apparatus as defined in claim 20 wherein said dispersive medium is located within said gain module.

22. Apparatus as defined in claim 20 wherein said dispersive medium is sodium chloride.

23. Apparatus as defined in claim 22 wherein said dispersive medium is used as windows in said laser gain module.

24. Apparatus as defined in claim 20 wherein said switch includes a dye laser and a pair of cadmium tellurium reflection switches actuated thereby.

* * * * *